United States Patent
Ward et al.

(10) Patent No.: US 6,709,160 B1
(45) Date of Patent: Mar. 23, 2004

(54) TURBOCHARGER BEARING LUBRICATION SYSTEM

(75) Inventors: Daniel N. Ward, Asheville, NC (US); Jaroslaw M. Kierat, Asheville, NC (US); Richard D. Hall, Marion, NC (US); Allen W. Gray, III, Asheville, NC (US)

(73) Assignee: BorgWarner, Inc., Auburns Hills, MI (US)

( * ) Notice: Subject to any disclaimer, the term of this patent is extended or adjusted under 35 U.S.C. 154(b) by 0 days.

(21) Appl. No.: 10/301,403

(22) Filed: Nov. 21, 2002

(51) Int. Cl.$^7$ ............................................... F16C 17/18
(52) U.S. Cl. ....................... 384/286; 384/901
(58) Field of Search .................... 384/901, 390, 384/448, 461, 286

(56) References Cited

U.S. PATENT DOCUMENTS

| | | | | |
|---|---|---|---|---|
| 5,454,646 A | * | 10/1995 | Reisdorf | 384/99 |
| 5,676,468 A | * | 10/1997 | Webb | 384/208 |
| 6,499,884 B1 | * | 12/2002 | Svihla et al. | 384/138 |

* cited by examiner

Primary Examiner—Lenard A. Footland
(74) Attorney, Agent, or Firm—Pendorf & Cutliff; Greg Dziegielewski

(57) ABSTRACT

A greatly simplified turbocharger assembly comprised of a minimum number of parts allows accurate and efficient control of oil flow over the bearings (44,46), thereby permitting excellent lubrication of the bearings with a reduced amount of oil flow through the bearing housing (16), resulting in significantly lower hydrocarbon leakage from the turbocharger into the engine or engine exhaust, and ultimately lower hydrocarbon emissions by the engine.

24 Claims, 2 Drawing Sheets

TURBOCHARGER BEARING LUBRICATION SYSTEM

FIELD OF THE INVENTION

The present relates to turbochargers for internal combustion engines and more particularly to a simplified assembly of and arrangement for lubricating the bearing system of a turbocharger.

BACKGROUND OF THE INVENTION

Turbochargers are widely used on internal combustion engines, and in the past have been particularly used with large diesel engines, especially for highway trucks and marine applications. In distinction to superchargers, which derive their power directly from the crankshaft of the engine, turbochargers are driven by the engine exhaust gases. Exhaust gases are directed to and drive a turbine, and the turbine shaft is connected to and drives the compressor. Ambient air is compressed by the compressor and fed into the intake manifold of the engine.

More recently, in addition to use in connection with large diesel engines, turbochargers have become popular for use in connection with smaller, passenger car power plants. The use of a turbocharger in passenger car applications permits selection of a power plant that develops the same amount of horsepower from a smaller, lower mass engine. Using a lower mass engine has the desired effect of decreasing the overall weight of the car, increasing sporty performance, and enhancing fuel economy. Moreover, use of a turbocharger permits more complete combustion of the fuel delivered to the engine, thereby reducing the hydrocarbon emissions of the engine which contributes to the highly desirable goal of a cleaner environment.

As the use of turbochargers finds greater acceptance in passenger car applications, three design criteria have moved to the forefront. First, the market is demanding that all components of the power plant of a passenger car, including the turbocharger, must provide reliable operation for a much longer period than was demanded in the past. That is, while it may have been acceptable in the past to require a major engine overhaul after 80,000–100,000 miles, it is now necessary to design engine components for reliable operation in excess of 200,000 miles of operation. This means that extra care must be taken to ensure proper lubrication of bearings supporting devices that rotate at very high rotational speeds, as in a turbocharger.

The second design criterion that has moved to the forefront in passenger car applications is that the power plant must meet or exceed very strict requirements in the area of minimized hydrocarbon emissions. Third, with the mass production of turbochargers for smaller passenger cars, it is highly desirable to design a turbocharger that meets the above criteria and is comprised of a minimum number of parts, which parts are easy to manufacture and easy to assemble, in order to provide a cost effective and reliable turbocharger.

As stated above, the demand for engine components that provide an extended service life requires that extra care must be taken to ensure proper lubrication of bearings that support devices rotating at very high rotational speeds, as in a turbocharger. In the prior art, two basic systems have been adopted to deliver lubricating oil to the critical wear points of a turbocharger using two floating journal bearings. First, the central bearing housing can be provided with lubricating oil channels directed to the top of the journal bearings, the so-called "top-delivered" system. With this system, oil is delivered to the top of the journal bearings, usually at the axial center of the bearings, and the bearings are normally provided with radial apertures in the center of the bearing to allow flow of the lubricating oil radially inwardly to the interface between the shaft and the inside diameter of the journal bearing. In this system, the oil must be supplied at high pressure in order to ensure that it will migrate inwardly through an aperture in a journal bearing while the journal bearing is spinning at a very high rate.

The second basic system for delivering lubricating oil to the journal bearings of a turbocharger is to deliver the oil to the center of the rotating shaft and allow the oil to migrate axially outwardly along the shaft and over the bearings before being released to the oil return sump and to the engine crankcase. In both of these systems, in order to provide adequate lubrication to the bearings, a high flow rate of oil has been provided to ensure that adequate coverage of the bearing surfaces is obtained. Especially in connection with the top-delivered system, a high percentage of the oil flowing through the system contacts only the outboard half of the outside diameter of the journal bearing before being expelled into the oil return sump. This means that a very high volume of flow must be provided to obtain any oil film coverage of the other surfaces of the journal bearing.

This high flow of oil through the bearing housing of a turbocharger increases the opportunity for oil to leak from the bearing housing into the turbine or compressor portions of the turbocharger. Internal combustion engines, whether diesel or gasoline, are designed for optimum combustion of the fuel for which they are designed. In either type of engine, when engine crankcase lubricating oil is introduced into the combustion chamber of the engine, it is not burned effectively, and a large portion of that oil is emitted as an undesired hydrocarbon pollutant. Engine manufacturers have been diligent in reducing the amount of lubricating oil that is allowed to enter the combustion chamber of the engine by improving piston ring and valve stem seal designs, and the like. Unfortunately, turbocharger design has not kept pace with this trend.

As stated, turbochargers commonly use crankcase oil to lubricate the rotating bearing interfaces as well as the thrust surfaces that limit axial excursions of the shaft and its turbine and compressor wheels. Since turbochargers operate at extremely high rotational speeds, sometimes in excess of 200,000 RPM, generous lubrication of these bearing surfaces is critical in order to provide a turbocharger capable of a long and reliable service life. With this high flow rate of oil over the journal bearings comes the possibility that some percentage of the oil will escape past the barriers set up in the turbocharger to prevent lubricating oil from entering either the turbine housing or the compressor housing.

More specifically, if lubricating oil from the center bearing housing migrates beyond the piston ring seal provided to prevent such migration at the turbine end of the housing, lubricating oil will enter the turbine housing and will be expelled with the exhaust flow out of the engine into the atmosphere. On the other hand, if lubricating oil from the center bearing housing migrates beyond the piston ring seal at the compressor end of the housing, the lubricating oil will enter the compressor housing and will be injected into the combustion chamber of the engine where it will not be properly burned and will be emitted by the engine as an undesired hydrocarbon pollutant. Unfortunately, as a result of this phenomenon, it is commonly believed that over half of the hydrocarbon emissions of turbocharged engines come from oil leakage through the turbocharger, not from the engine itself.

Thus, it seems that these two design criteria point a designer in different directions. That is, if it is desired to achieve longer service life of a turbocharger, the flow of oil over the bearings should be increased to minimize metal-to-metal contact between parts and decrease wear of the parts. On the other hand, if hydrocarbon emissions of the engine are to be decreased, oil flow through the bearing housing should be minimized to decrease the opportunity for oil leakage into the turbine or compressor housings of the turbocharger.

Many attempts have been made to minimize leakage of oil from a turbocharger bearing housing, but these have always taken the form of adding a number of parts or a new sub-assembly, such as an oil deflector, extra seals, or the like. While this may assist in reducing oil leakage from the bearing housing, it is contrary to the third design criterion mentioned above. That is, adding more parts or a new sub-assembly tends to make the turbocharger more complicated and expensive, when it is desired to make the turbocharger simpler and easier to manufacture and assemble.

An earlier attempt at providing a simplified bearing system is shown in U.S. Pat. No. 3,993,370 to Woollenweber. That patent shows a bearing system in which the journal bearings are constrained to ride on the bearing lands of the center housing by a shoulder of the center housing on the inboard side of the bearings, and by a shoulder formed on the shaft at the turbine end and a thrust collar that rotates with the shaft at the compressor end of the center housing. With this arrangement, none of the thrust-bearing surfaces is between the shaft, which rotates at very high speed, and a stationary surface. Rather, the thrust-bearing surfaces are between the end surfaces of the journal bearings, which rotate at speeds less than the speed of the shaft, and either a stationary surface on the housing or a shoulder or collar carried by the shaft. Thus, the bearing assembly of Woollenweber provides reduced relative speed between the rotating assembly of the turbocharger and the thrust-bearing surfaces on the combined journal and thrust bearings, regardless of the direction in which the thrust force acts, and the conventional thrust bearing assembly has been eliminated.

Lubrication is still provided in the conventional manner of a positive pressure, top-delivered system that requires oil flow radially inwardly through a spinning bearing in order to deliver lubricating oil to the rotating interface between the shaft and the inside diameter of the journal bearing. A radial aperture through the journal bearing is provided for that purpose.

Another simplified bearing system is shown in Swiss Patent No. 407,665 to Buechi. That patent shows, in the context of a turbocharger, a pair of floating bearings constrained to float at their respective bearing lands within a center housing (See FIGS. 1 and 2). On the outboard side, the bearings are constrained from axial movement by a collar that is carried by the shaft. On the inboard side, the bearings are constrained by axial abutment surfaces on a pair of rings, which in turn are held in their axial position by conventional snap rings.

Oil is delivered centrally between the bearings and is allowed to migrate axially outwardly along the shaft to reach the bearings. It is not clear whether any attempt is made to balance the oil pressure on various surfaces of the bearings or to control the flow of oil over those surfaces to achieve maximum efficiency of lubrication of the bearings with minimum flow rate of oil. It is clear that no axial aperture is provided through the bearing, nor is any axial groove provided in the inside diameter or the outside diameter of the bearing to provide a means for controlling the flow rate of oil across the journal bearings. As a further indication that such control is not present, it is noted that Buechi believed two piston rings were required in each axial direction to control undesired oil flow into either the turbine or compressor housings.

It appears that if the Buechi structure employed normal bearing clearances between the journal bearing and the shaft, and between the journal bearing and the housing, the flow of oil around the journal bearing would be too low to provide adequate lubrication to the thrust surfaces at the axial ends of the journal bearings. On the other hand, if the clearances between the journal bearing and the shaft, and between the journal bearing and the housing, were large enough to provide oil flow adequate to lubricate the thrust bearings, the journal bearings would not provide stable rotational support for the shaft and the turbine and compressor wheels.

SUMMARY OF THE INVENTION

It is therefore a primary object of the invention to provide a turbocharger bearing system characterized by a highly efficient, controlled lubrication system that permits excellent lubrication of the bearings with a minimum of oil flow through the bearing housing, thereby providing a turbocharger that is reliable and durable in operation.

Another object of the invention is to provide a turbocharger bearing assembly that will significantly reduce the amount of oil that is leaked into the engine intake or exhaust streams, thereby greatly reducing the hydrocarbon emissions of the engine.

A further object of the invention is to accomplish the above objects while providing a turbocharger bearing assembly that is greatly simplified, being comprised of a reduced number of parts, each of which is easy to manufacture, and which are easy to assemble to form a turbocharger that is efficient and durable in operation.

In accordance with the present invention, these and other objects are achieved by providing a greatly simplified turbocharger assembly that allows accurate and efficient control of oil flow over the bearings, thereby permitting excellent lubrication of the bearings with a reduced amount of oil flow through the bearing housing, resulting in significantly lower hydrocarbon leakage from the turbocharger into the engine or engine exhaust, and ultimately lower hydrocarbon emissions by the engine. In a preferred embodiment of the invention, this is accomplished by receiving a turbocharger shaft in a central bore in the bearing housing and supporting that shaft on a pair of floating journal bearings riding on bearing lands formed in the housing. The journal bearings are axially constrained on their inboard sides by a shoulder in the bearing bore of the housing and on their outboard side by a step in the shaft at the turbine end of the bearing housing and by a flinger sleeve carried by the shaft at the compressor end of the bearing housing. The flinger sleeve is held in place on the shaft by the compressor wheel, which in turn is threaded onto the shaft by cooperating threads at the nose of the compressor wheel, thereby eliminating the need for a washer and/or nut for attaching the wheel.

To provide lubrication to the bearings, a central lubrication inlet port is provided in the housing in communication with the central bore between the bearing lands. Lubricant proceeds from the inlet port axially in both directions along the shaft through a gap between the shaft and the central bore to the journal bearings. At the journal bearings, the lubricant flows between the shaft and the journal bearings, past the axial ends of the journal bearings to lubricate the axial thrust surfaces formed thereon, and over the journal bearings to lubricate the rotating interface between the journal bearings and the housing.

In order to control oil flow through the housing and balance oil pressure around the journal bearings, great care is taken to size the various passages through the housing and around the bearings, and an axial passage is provided in the bearings extending from the inboard end of the bearings to the outboard ends thereof. This axial passage can take the form of a bore through the bearing, or a groove in the inner and/or outer diameter of the bearings.

More specifically, the passages begin with the inlet port that has a first cross sectional area. The oil then proceeds to an axial channel defined by the difference between the area of the central housing bore and the cross sectional area of the shaft disposed in the bore. This difference must be multiplied by two since the oil flow proceeds in two axial directions. If the size of the bore or the shaft is different in the two axial directions, this must be taken into account in determining the total cross sectional area of the combined axial channels. It is also possible that these axial channels may not have a constant cross sectional area along their axial extent. That is, either the central bore in the housing or the portion of the shaft disposed in the central bore could be tapered causing the cross sectional area to change along the axial length of the channel. In this instance, the area under consideration that determines oil flow is the smallest cross sectional area in that channel.

The third area to be controlled to achieve the desired flow of oil across the journal bearings is the total area available for oil flow over, under, around and through the journal bearings in the bearing lands of the housing. This area can be defined as the total area of the bearing lands minus the cross sectional area of the shaft disposed in the bearing lands, minus the cross sectional area of the journal bearings, which does not include the area of any aperture or groove in the journal bearing. Again, the sum in both axial directions must be considered to determine the total area of the third channel.

In general, the areas must be arranged so that the first area is equal to or greater than the area of the third channel around the journal bearings. In order to achieve an oil flow rate adequate to lubricate the axial end thrust surfaces of the journal bearings, an axial passage must be provided in the journal bearings, either under, over, or through the journal bearings. As a result, the flow area through the third channel will necessarily be greater than the flow area over a journal bearing located in the third channel with no axial apertures or grooves provided for this purpose. Since the journal bearings of the present invention act as both rotational journal bearings and as thrust bearings, it is important that all faces, both radial and axial, receive adequate lubrication. This is accomplished by metering the flow rate of oil across the bearings by use of an aperture or groove in the journal bearings, thereby providing a flow rate that is greater than would have been available if no such aperture or grooves were included, and less than the wasteful and polluting quantities of oil emitted into the atmosphere when a top-delivered system of lubrication is used. With this arrangement, an adequate flow rate of oil can be maintained to keep to keep the inside and outside diameter portions of the journal bearings properly lubricated, and to provide adequate lubrication to the axial thrust surfaces of the journal bearings, while still keeping the total flow rate of oil to a minimum to reduce the potential for oil leaking to the turbine or compressor housings and thus creating unwanted hydrocarbon emissions.

Preferably, the channels proceeding in the two axial directions from the inlet port are symmetrical for ease of manufacture of the parts and for uniform control of oil flow in the two directions. In addition, the journal bearings themselves are preferably identical. Alternatively, it may be desirable to provide a greater flow rate of oil in one direction than in the other. For example, it may be desirable to provide a greater flow of oil over the journal bearing at the turbine end of the bearing housing than that provided at the compressor end because the turbine end is hotter and the journal bearing at that end needs more cooling effect from the oil flow. To accomplish this, the cross sectional areas of the axial channels leading to the journal bearings can be adjusted to promote this uneven flow. Further, the cross sectional area of the oil flow channels in the region of the bearing lands can be modified so that an increased flow is permitted over the journal bearing at the turbine end of the bearing housing as compared to the flow over the journal bearing at the compressor end of the bearing housing. In a preferred embodiment of the invention, the cross sectional area of the combined, axial channels is less than the area of the inlet port and greater than the cross sectional area of the third channel around the journal bearings.

To promote axial flow of lubricating oil away from the journal bearing at the turbine end of the bearing housing, the shoulder of the shaft is provided with an abutment surface to abut the outboard end of the journal bearing, and that abutment surface has an outer diameter substantially less than the outer diameter of the journal bearing. To direct oil flow from the journal bearing into the oil return sump and away from the turbine housing, the shoulder has an increased diameter portion axially spaced from the journal bearing for flinging oil off of the shaft before it can migrate toward the turbine end of the shaft. Similarly, a flinger sleeve at the compressor end of the bearing housing has an abutment surface to abut the outboard end of the journal bearing at the compressor end of the housing, and that abutment surface has an outer diameter substantially less than the outer diameter of the journal bearing. Also, the flinger sleeve has an increased diameter portion axially spaced from the journal bearing for flinging oil off of the shaft before it can migrate toward the compressor end of the shaft.

In a preferred embodiment of the invention, the journal bearings are provided with chamfers at the intersection of the inner surface and the outer surface with the inboard and outboard ends of the bearings. In order to promote flow of lubricating oil to the interface between the shaft and the journal bearing, the chamfer at the intersection of the inner surface of the bearing with the inboard and outboard ends is greater than the chamfer at the intersection of the outer surface with the inboard and outboard ends.

Since the journal bearings of the present invention serve both as journal bearings for rotationally supporting the turbocharger shaft and as thrust bearings for limiting axial excursions of the shaft, the axial end faces of the journal bearings are preferably provided with radial grooves to promote flow of oil across those thrust surfaces. To permit the journal bearing end faces to serve as effective thrust bearing surfaces, the radial grooves preferably have adjacent ramp portions leading to flat thrust bearing lands on the end faces. In the most preferred embodiment of these bearings, the radial grooves have adjacent ramp portions leading to flat thrust bearing lands on both sides of said grooves forming symmetrical thrust surfaces on said inboard and outboard ends. With this arrangement, the journal bearings can themselves be symmetrical so that they can be assembled in the turbocharger assembly in either axial direction, thereby simplifying the assembly step and making it easier to manage.

In summary, concerning the above-described structure, it is noted that complicated turbochargers in the prior art often are constructed of more than one hundred parts. Even relatively simple turbochargers commonly used today are comprised of forty parts or more. Remarkably, the turbocharger of the present invention provides a fully functional turbocharger that is efficient and durable in operation and is comprised of a total of twelve parts.

Lastly, a method for lubricating a rotating shaft is disclosed that employs a turbocharger structure as set forth above and includes the steps of supplying the bearing housing with a lubricant under pressure, and channeling that lubricant through a series of lubricant transmission channels, the last such channel having a cross sectional area equal to or smaller than the first channel. Preferably, each successive channel has a cross sectional area equal to or smaller than the preceding channel. The method further includes the step of balancing the pressure of the lubricant to achieve substantially equal pressure on all faces of the journal bearings in the bearing lands, and the step of forming a lubricant film on the end thrust surfaces of the journal bearings.

In all of the above-described embodiments of the invention, the apparatus employed to practice this invention is relatively easy to manufacture and has a minimum number of parts. In addition, the lubrication system is efficient and effective, thereby producing a turbocharger capable of a very long useful life while still reducing the amount of lubricant necessary to achieve these ends, and, therefore, significantly reducing the amount of hydrocarbon emissions caused by the turbocharger.

These and other aspects of the invention will be more apparent from the following description of the preferred embodiments thereof when considered in connection with the accompanying drawings and appended claims.

BRIEF DESCRIPTION OF THE DRAWINGS

The present invention is illustrated by way of example and not limitation in the accompanying drawings in which like references indicate similar parts, and in which.

DETAILED DESCRIPTION OF THE PREFERRED EMBODIMENTS

Figure 1:
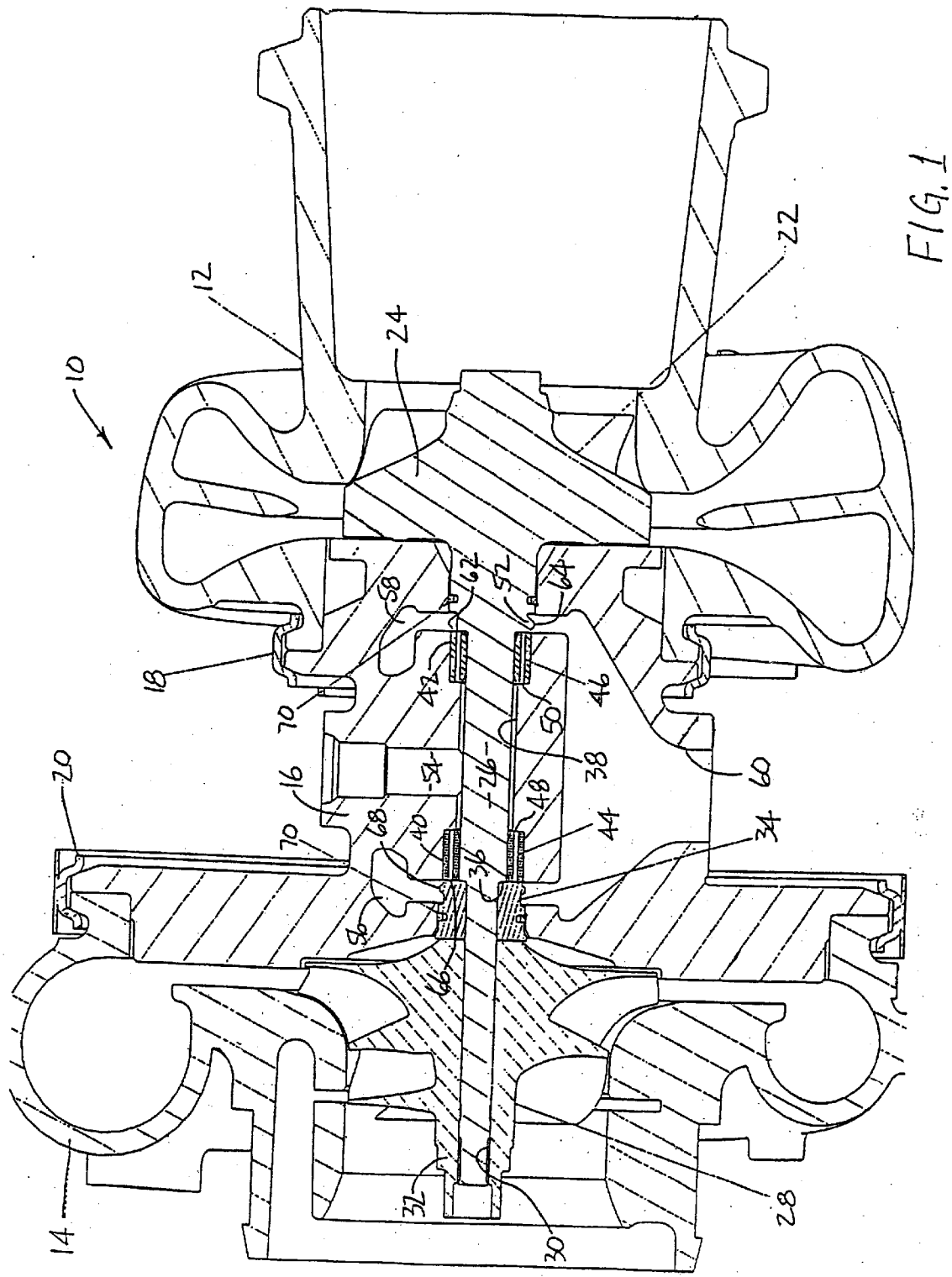
FIG. 1 is a front elevational view, taken in section, of a turbocharger incorporating a bearing and lubrication system in accordance with one embodiment of the invention.

A turbocharger assembly is generally shown at 10 in FIG. 1 and is comprised of a turbine housing 12, a compressor housing 14, and a bearing housing 16 disposed between the turbine and compressor housings. The turbine housing 12 is attached to one end of the bearing housing 16 by a V-band clamp 18 that allows the turbine housing to be oriented in any desired rotational orientation to the bearing housing as may be required by the geometry of a particular customer's engine compartment. Similarly, the compressor housing 14 is attached to the opposite end of the bearing housing 16 by another V-band clamp 20, which also permits the compressor housing to be positioned in any desired rotational orientation with respect to the bearing housing, as customer's needs may dictate.

A turbine wheel and shaft assembly 22 is disposed in the turbocharger 10 with the turbine wheel 24 surrounded by the turbine housing 12 and the shaft 26 extending through the bearing housing 16 and into the compressor housing 14. A compressor wheel 28 is mounted on the distal end of the shaft 26 and is disposed in the compressor housing 14. In the embodiment illustrated, the compressor wheel 28 is secured to the shaft 26 by internal threads 30 formed in the nose portion 32 of the compressor wheel, which threads cooperate with external threads on the distal end of the shaft 26. To complete the rotating assembly, a flinger sleeve 34 is mounted for rotation with the shaft 26 by being captured between a shoulder 36 on the shaft and the compressor wheel 28.

To receive the shaft 26 in the bearing housing 16, the bearing housing 16 has a central bore 38, and the central bore 38 includes a pair of enlarged diameter portions forming bearing lands 40 and 42. To rotationally support the shaft 26 and the turbine and compressor wheels, a pair of rotationally floating journal bearings 44 and 46 are received in the bearing lands 40 and 42, respectively. The bearings 44 and 46 are axially constrained to float on their respective bearings lands 40 and 42, on their inboard sides, by shoulders 48 and 50 that are formed in the bearing housing 16 where the central bore 38 steps up to a larger diameter to form the bearing lands 40 and 42. The bearings 44 and 46 are axially constrained to float on their respective bearings lands 40 and 42, on their outboard sides, by a shoulder 52 on the shaft 26 at the turbine end of the bearing housing 16, and by the flinger sleeve 34 at the compressor end of the bearing housing 16.

When in operation, the shaft 26 of the turbocharger 10 is often subjected to axial thrust forces that may operate in either axial direction during different phases of operation. To keep the rotating assembly of the turbocharger of the present invention in its desired axial position within the turbocharger, the journal bearings 44 and 46 also act as thrust bearings. That is, when axial thrust forces are acting on the rotating assembly from the turbine end toward the compressor end, the shoulder 52 on the shaft 26 will bear against outboard end of the journal bearing 46, and the inboard end of the bearing 46 will contact the shoulder 50 on the inboard side of the bearing land 42 to limit axial movement of the rotating assembly toward the compressor end of the turbocharger. Conversely, when axial thrust forces are acting on the rotating assembly from the compressor end toward the turbine end, the flinger sleeve 34 will bear against outboard end of the journal bearing 44, and the inboard end of the bearing 44 will contact the shoulder 48 on the inboard side of the bearing land 40 to limit axial movement of the rotating assembly toward the turbine end of the turbocharger. With this simple arrangement, the often complicated and expensive conventional thrust bearing assembly can be completely eliminated.

In order to lubricate the bearing system described above, a lubricant, which is normally engine crankcase lubricating oil, is introduced under pressure through a lubricant inlet port 54 formed in the bearing housing 16. The inlet port 54 is a simple straight bore in the housing 16 that communicates with the central bore 38 in the bearing housing. From the inlet port 54, lubricant migrates axially outwardly along the shaft 26 in both axial directions in the space between the shaft 26 and the central bore 38 toward the journal bearings 44 and 46. When the lubricant reaches the journal bearings 44 and 46, it is constrained to flow through a plurality of flow paths around the journal bearings and into a pair of oil collection spaces 56 and 58, and from there into an oil collection sump 60 where it is returned to the engine crankcase in a conventional manner.

In order to control the flow of lubricating oil through the bearing assembly described above and achieve optimum lubrication of the bearings with a minimum flow rate of oil, the cross sectional areas of the various channels through which the oil flows is carefully planned to ensure that the bearings are constantly surrounded by an oil film. More specifically, three distinct channels of oil flow are considered and regulated by design in order to achieve the desired results. First, the inlet port 54 is formed to have a known first cross sectional area. Second, the axial flow channels from the inlet port 54 to the journal bearings 44 and 46 have a cross sectional area defined by the area of the central bore 38 minus the area occupied by the shaft 26. Since these axial flow channels extend in two axial directions from the inlet port 54, the cross sectional area defined above must be doubled to compare it with the area of the inlet port 54. Also, if the area of either the bore 38 or the shaft 26 is different on opposite sides of the inlet port 54, this must be considered in determining the effective area of the second flow channel. Preferably, the bore 38 has a constant diameter between the bearing lands 40 and 42 in the bearing housing 16, and the shaft 26 also has a constant diameter in the portion disposed between the bearing lands 40 and 42. Even if these axial flow channels have a varying cross sectional area, the minimum cross sectional area will be considered for flow control purposes.

Lastly, the third channel of oil flow is defined by the paths through which oil must flow to move from the inboard side of the journal bearings 44 and 46 to the outboard side of the bearings. The cross sectional area of this third channel is thus defined by the cross sectional area of the bearing lands 40 and 42, minus the area represented by the portion of the shaft disposed in the bearings lands 40 and 42, and minus the area represented by the cross section of the journal bearings 44 and 46. In this regard, it should be noted that the cross sectional area of the journal bearings does not include any area of that cross section that is represented by an axially extending aperture or groove through the bearing.

In general, the design criterion for controlling oil flow over the journal bearings is that the area of the first flow channel must be equal to or greater than the area of the third flow channel to provide predictable, pressurized, and metered oil flow to the journal bearings 44 and 46 and to the bearing lands 40 and 42. Moreover, to achieve the desired balance of oil flow over the journal bearings 44 and 46 within the third oil flow channel, care must be taken to regulate the size of the various oil flow paths within the third oil flow channel.

The object within the third oil flow channel is to provide full 360 degree surrounding of the journal bearings 44 and 46 with a lubricating oil film so that no metal-to-metal contact is made, in order to achieve the desired long service life of the turbocharger bearing assembly. To achieve this, the clearance between the journal bearing inside diameter and the shaft 26, and the clearance between the journal bearing outside diameter and the bearing lands 40 and 42 are regulated to achieve a balanced flow under and over the journal bearings. In addition, to balance oil pressure on the axial ends of the journal bearings 44 and 46, an axial lubricant communication means is formed in the journal bearings. This axial lubricant communication means can take the form of an axial aperture through the bearing or an axial groove extending from the inboard end of the bearing to the outboard end.

Because the journal bearings 44 and 46 rotate at high speed (although not at the speed of the shaft 26), oil delivered to the journal bearings 44 and 46 tends to be forced to the outer diameter of the bearings. Since there is a significant difference in rotational speed of the shaft 26 and the journal bearings 44 and 46, it is critical that the interface between the shaft and the journal bearings be well lubricated. For that purpose, chamfers are provided at the intersection of the inner surface and the outer surface of the journal bearings 44 and 46 with the axial end surfaces of the journal bearings, and the chamfer at the intersection of the inner surface of the journal bearings with the end surfaces thereof is greater than the chamfer at the intersection of the outer surface and the end surfaces.

After the oil has flowed across the journal bearings 44 and 46, it is released into a space in the bearing housing 16 outboard of the bearing lands 40 and 42. It is at this point that the turbocharger may leak lubricating oil into either the turbine or compressor housings and create undesired hydrocarbon emissions by the engine. To prevent or at least minimize this, the turbocharger of the present invention is provided with a system for allowing free flow of oil axially away from the journal bearings, while minimizing the opportunity for that oil to enter either the turbine or compressor housings.

For this purpose, the shoulder 52 on the shaft 26 at the turbine end of the shaft presents an abutment surface 62 to the outboard end of the journal bearing 46, and the abutment surface 62 has an outside diameter substantially less than the outer diameter of the journal bearing 46. This reduced outer diameter of the abutment surface 62 permits free flow of lubricating oil off of the journal bearing 46 into the oil collection space 58. To discourage further migration of lubricating oil toward the turbine housing, the shoulder 52 is provided with an increased diameter portion 64, axially spaced from the journal bearing 46, for flinging oil off of the shoulder 52 before that oil is allowed to migrate axially toward the turbine.

Similarly, the flinger sleeve 34 at the compressor end of the shaft presents an abutment surface 66 to the outboard end of the journal bearing 44, and the abutment surface 66 has an outside diameter substantially less than the outer diameter of the journal bearing 44. This reduced outer diameter of the abutment surface 66 permits free flow of lubricating oil off of the journal bearing 44 into the oil collection space 56. To discourage further migration of lubricating oil toward the compressor housing, the flinger sleeve 34 is provided with an increased diameter portion 68, axially spaced from the journal bearing 44, for flinging oil off of the flinger sleeve 34 before that oil is allowed to migrate axially toward the compressor housing.

In order to provide a seal to prevent migration of lubricating oil from the bearing housing 16 into either the turbine housing 12 or the compressor housing 14, a pair of piston rings 70 are provided to seal the interface between the shoulder 52 and the bearing housing 16, and between the flinger sleeve 34 and the bearing housing 16.

Figure 2:
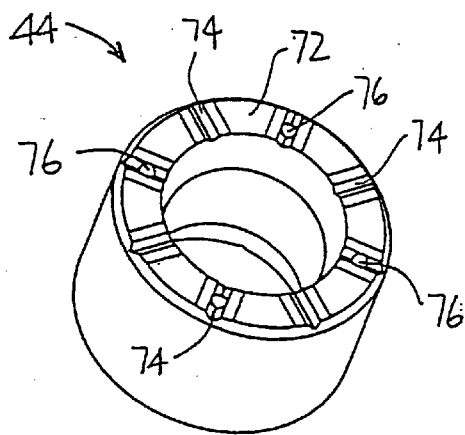
FIG. 2 is an enlarged, perspective view of the journal bearing employed in the turbocharger of FIG. 1.

To illustrate further details of the turbocharger of the present invention, FIG. 2 is a perspective view of one of the journal bearings 44 or 46. As a feature of the ease of manufacture of the turbocharger of the present invention, the journal bearings 44 and 46 are preferably identical. As seen in FIG. 2, the axial end face 72 of the journal bearing 44 is provided with a plurality of radial grooves 74 to permit radial flow of lubricating oil across the end face 72, thereby lubricating the thrust surface between the journal bearing 44 and the shoulder 48 on the bearing housing 16. In this instance, eight such radial grooves are illustrated, circumferentially spaced 45 degrees from one another. It will be appreciated that these radial grooves 74 are formed in both ends of the journal bearing 44, and in both ends of the journal bearing 46. As a consequence, they serve to lubricate all four thrust surfaces on the axial ends of the journal bearings 44 and 46. Any suitable number of such grooves will suffice, but eight is currently preferred.

It is further apparent from the illustration in FIG. 2 that the journal bearing 44 (and 46) has a plurality of axial apertures extending through the journal bearing from one axial end to the other. In this case, four such apertures are illustrated, coinciding with every other radial groove 74, but it will be apparent that any other suitable number of such apertures will suffice.

Figure 3:
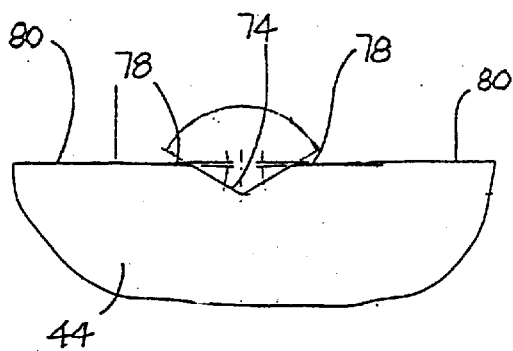
FIG. 3 is a further enlarged, fragmentary view of a portion of the journal bearing of FIG. 2, taken along the line 3—3 of FIG. 2, and illustrating some details of that portion of the journal bearing.

As can best be seen in FIG. 3, the radial grooves 74 are preferably accompanied by adjacent ramp surfaces 78 leading to and intended to form a lubricating film at a flat thrust land surface 80 coincident with the axial end face 72 of the journal bearings 44 and 46. Preferably, the radial groove 74 forms an angle of about 120 degrees, and the ramp surfaces 78 form an angle with the flat thrust land surface 80 of about 2–3 degrees. In the most preferred embodiment of the journal bearings, the ramp surfaces 78 extend circumferentially from the grooves 74 in both circumferential directions so that the journal bearings 44 and 46 can be assembled in either axial direction on the shaft 26, and without regard to the rotational direction of the shaft 26.

Figure 4:
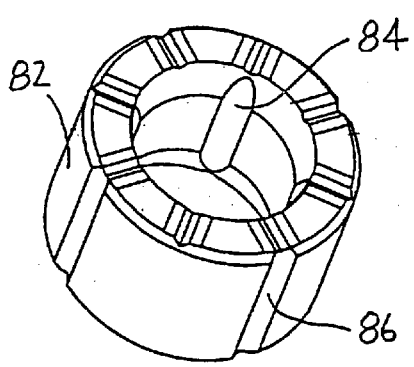
FIG. 4 is a perspective view of a journal bearing, as in FIG. 2, but illustrating an alternative embodiment of a journal bearing for use in connection with the turbocharger of the present invention.

FIG. 4 illustrates an alternative journal bearing 82 for use with the turbocharger of the present invention. Journal bearing 82 is similar in all respects to the journal bearings 44 and 46 except that the journal bearing 82 is provided with axial grooves 84 in the inside diameter of the journal bearing extending from the inboard end of the journal bearing to the outboard end. In addition, the bearing 82 may be provided with axial grooves 86 in the outside diameter of the journal bearing extending from the inboard end to the outboard end thereof. It will be understood that these grooves can be provided on either the inside or outside diameter of the journal bearing, or both.

Figure 5:
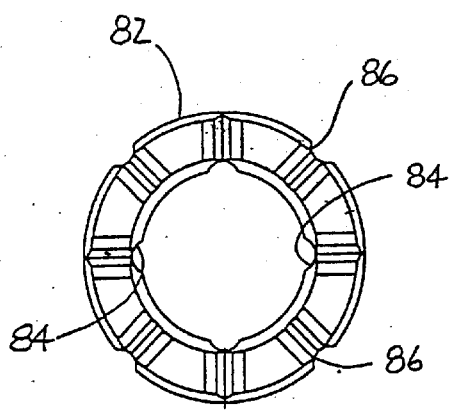
FIG. 5 is an end view of the journal bearing of FIG. 4, taken along the line 5—5 of FIG. 4.

FIG. 5 is an end view of the journal bearing 82 clearly showing the axial grooves 84 in the inside diameter of the journal bearing and the axial grooves 86 in the outside diameter of the journal bearing.

Lastly, a method for lubricating a rotating shaft is disclosed that employs a turbocharger 10 as set forth above and includes the steps of supplying the bearing housing 16 with a lubricant under pressure, and channeling that lubricant through a series of lubricant transmission channels, the first such channel having a cross sectional area equal to or greater than the last channel. The method also includes the step of channeling the lubricant through a series of three lubricant transmission channels, each successive channel having a cross sectional area equal to or smaller than the preceding channel. The method further includes the step of balancing the pressure of the lubricant to achieve substantially equal pressure on all faces of the journal bearings in the bearing lands, and the step of forming a lubricant film on the end thrust surfaces 80 of the journal bearings 44 and 46.

Various modifications and changes may be made by those having ordinary skill in the art without departing from the spirit and scope of this invention. Therefore, it must be understood that the illustrated embodiments of the present invention have been set forth only for the purpose of example, and that they should not be taken as limiting the invention as defined in the following claims.

The words used in this specification to describe the present invention are to be understood not only in the sense of their commonly defined meanings, but to include by special definition, structure, material, or acts beyond the scope of the commonly defined meanings. The definitions of the words or elements of the following claims are, therefore, defined in this specification to include not only the combination of elements which are literally set forth, but all equivalent structure, material, or acts for performing substantially the same function in substantially the same way to obtain substantially the same result.

In addition to the equivalents of the claimed elements, obvious substitutions, now or later known to one of ordinary skill in the art, are defined to be within the scope of the defined elements.

The claims are thus to be understood to include what is specifically illustrated and described above, what is conceptually equivalent, what can be obviously substituted, and also what incorporates the essential idea of the invention.

We claim:

1. A bearing assembly comprising:
a bearing housing (16) having a bore (38) extending therethrough;
a shaft (26) extending through said bore (38) and adapted to rotate at high speed with respect to said housing (16) and being subjected to axial thrust forces applied thereto in both axial directions, said shaft (26) having a shoulder (52) adjacent one end of said housing (16) and a sleeve (34) carried on said shaft (26) adjacent the opposite end of said housing (16);
said housing (16) having a pair of longitudinally spaced bearing lands (40,42) adapted to surround portions of said shaft (26) and being disposed to one side of said shoulder (52), adjacent inboard end portions of said bearing lands (40,42) being provided with axially outwardly facing inboard thrust surfaces (48,50), the opposite end of one of said bearing lands (42) being adjacent said shoulder (52) and the opposite end of the other bearing land (40) being disposed adjacent said sleeve (34), said housing (16) further being provided with an inlet port (54) for a lubricant, said inlet port (54) being in communication with said bore (38) between said bearing lands (40,42); and
a pair of floating journal bearings (44,46) rotatably mounted within said bearing lands (40,42), each journal bearing having an inner surface in proximity to and encompassing a shaft portion and an outer surface in proximity to an adjacent surface of one of said bearing lands (40,42), each journal bearing (44,46) having an inboard end and an outboard end, each journal bearing being provided with axial lubricant communication means (76) extending from said inboard end to said outboard end;
whereby lubricant in said inlet port (54) is caused to flow from said inlet port to said bore (38) between said journal bearings (44,46), then axially outwardly between the shaft (26) and the bore (38) in said housing (16), and around said journal bearings (44,46) and through said axial lubricant communication means (76) in said journal bearings (44,46).

2. The bearing assembly of claim 1 wherein:

said inlet port (54) has a cross sectional area defining an inlet lubrication transmitting area; and said bearing lands (40,42) formed in said housing (16) each have a cross sectional area, the portions of said shaft (26) surrounded by said bearing lands (40,42) each have a cross sectional area, the journal bearings (44,46) each have a cross sectional area that does not include the area defined by the axial lubricant communication means (76) of each journal bearing (44,46), whereby the cross sectional area of said bearing lands (40,42), minus the cross sectional area of the portions of said shaft (26) surrounded by said bearing lands (40,42), minus the cross sectional area of said journal bearings (44,46) defines a bearing lubrication transmitting area;

further characterized in that said inlet lubrication transmitting area is equal to or greater than said bearing lubrication transmitting area.

3. The bearing assembly of claim 2 wherein a portion of said bearing lubrication transmitting area is defined at each of said bearing lands (40,42), and said portions of said bearing lubrication transmitting area are substantially equal.

4. The bearing assembly of claim 2 wherein a portion of said bearing lubrication transmitting area is defined at each of said bearing lands (40,42), and one of said portions of said bearing lubrication transmitting area is substantially greater than the other.

5. The bearing assembly of claim 2 wherein:

said central bore (38) has a cross sectional area in each axial direction from said inlet port (54), and the portion of said shaft (26) disposed in each axial section of said central bore (38) has a cross sectional area less than the cross sectional area of the portion of said central bore (38) in which said portion of said shaft (26) is disposed, whereby the difference between the cross sectional area of said central bore portions and the cross sectional area of the portion of said shaft disposed in each central bore portion defines an axial lubrication transmitting area;

further characterized in that said inlet lubrication transmitting area is equal to or greater than said axial lubrication transmitting area, and said axial lubrication transmitting area is equal to or greater than said bearing lubrication transmitting area.

6. The bearing assembly of claim 1 wherein said shaft (26) has a turbine end and a compressor end, and said shoulder (52) is formed at the turbine end and abuts an outboard end of one of said journal bearings (46), said shoulder (52) presenting an abutment surface (62) to said journal bearing (46), said abutment surface (62) having an outside diameter substantially less than the outside diameter of said journal bearing (46), said shoulder (52) further including an increased diameter portion (64) axially spaced from said journal bearing (46) for flinging oil off of said shoulder (52) before said oil can migrate axially further toward said turbine end of said shaft (26).

7. The bearing assembly of claim 1 wherein said shaft (26) has a turbine end and a compressor end, and said sleeve (34) carried on said shaft (26) is disposed at the compressor end and abuts an outboard end of one of said journal bearings (44), said sleeve (34) presenting an abutment surface (66) to said journal bearing (44), said abutment surface (66) having an outside diameter substantially less than the outside diameter of said journal bearing (44), said sleeve (34) further including an increased diameter portion (68) axially spaced from said journal bearing (44) for flinging oil off of said sleeve (34) before said oil can migrate axially further toward said compressor end of said shaft (26).

8. The bearing assembly of claim 1 wherein said sleeve (34) carried on said shaft (26) is held on said shaft (26) by a compressor wheel (28) also carried on said shaft (26).

9. The bearing assembly of claim 8 wherein said compressor wheel (28) is held on said shaft (26) by cooperating threads (30) at the axially outward end of said shaft (26) and said wheel (28), said wheel (28) capturing said sleeve (34) between said wheel (28) and a second shoulder (36) formed on said shaft (26).

10. The bearing assembly of claim 1 wherein said bore (38) has a constant diameter between said bearing lands (40,42).

11. The bearing assembly of claim 1 wherein said shaft (26) has a constant diameter between said bearing lands (40,42).

12. The bearing assembly of claim 1 wherein said journal bearings (44,46) are identical.

13. The bearing assembly of claim 1 wherein said axial lubricant communication means (76) is an aperture extending through said journal bearing (44) from said inboard end to said outboard end.

14. The bearing assembly of claim 1 wherein said axial lubricant communication means (84) is a groove in the inside diameter of said journal bearing (82) extending from said inboard end to said outboard end.

15. The bearing assembly of claim 1 wherein said axial lubricant communication means (86) is a groove in the outside diameter of said journal bearing (82) extending from said inboard end to said outboard end.

16. The bearing assembly of claim 1 wherein the journal bearings (44,46) have a chamfer at the intersection of said inner surface and said outer surface with said inboard and outboard ends.

17. The bearing assembly of claim 16 wherein said chamfer at the intersection of said inner surface with said inboard and outboard ends is greater than the chamfer at the intersection of said outer surface with said inboard and outboard ends.

18. The bearing assembly of claim 1 wherein said inboard and outboard ends of said journal bearings (44,46) include radial grooves (74).

19. The bearing assembly of claim 18 wherein said radial grooves (74) have an adjacent ramp portion (78) leading to a flat thrust bearing land (80) on said inboard and outboard ends.

20. The bearing assembly of claim 19 wherein said radial grooves (74) have adjacent ramp portions (78) leading to flat thrust bearing lands (80) on both sides of said grooves (74) forming symmetrical thrust surfaces on said inboard and outboard ends.

21. A turbocharger comprising:

a bearing housing (16) having a bore (38) therethrough;

a turbine housing (12) attached to one end of said bearing housing (16);

a compressor housing (14) attached to the other end of said bearing housing (16);

a shaft (26) extending from said turbine housing (12), through said bearing housing (16) and into said compressor housing (14), said shaft (26) being mounted for high speed rotation with respect to said bearing housing (16) and being subjected to axial thrust forces applied thereto in both axial directions, said shaft (26) having a turbine wheel (24) mounted on one end thereof for rotation within the turbine housing (12) and a compressor wheel (28) mounted on the other end for rotation within the compressor housing (14), said shaft (26) having a shoulder (52) adjacent the turbine wheel (24) and a sleeve (34) carried on said shaft (26) adjacent the compressor wheel (28);

said bearing housing (16) having a pair of longitudinally spaced bearing lands (40,42) adapted to surround portions of said shaft (26) and being disposed to one side of said shoulder (52), adjacent inboard end portions of said bearing lands (40,42) being provided with axially outwardly facing inboard thrust surfaces (48,50), the opposite end of one of said bearing lands (42) being adjacent said shoulder (52) and the opposite end of the other bearing land (40) being disposed adjacent said sleeve (34), said housing (16) further being provided with an inlet port (54) for a lubricant, said inlet port (54) being in communication with said bore (38) between said bearing lands (40,42), and said inlet port (54) having a cross sectional area defining a first lubrication transmitting area; and a pair of floating journal bearings (44,46) rotatably mounted within said bearing lands (40,42), each journal bearing having an inner surface in proximity to and encompassing a shaft portion and an outer surface in proximity to an adjacent surface of one of said bearing lands (40,42), each journal bearing (44,46) having an inboard end and an outboard end, each journal bearing (44,46) being provided with axial lubricant communication means (76) extending from said inboard end to said outboard end;

said bearing lands (40,42) each have a cross sectional area, the portions of said shaft (26) surrounded by said bearing lands (40,42) each have a cross sectional area, the journal bearings (44,46) each have a cross sectional area that does not include the area defined by the axial lubricant communication means (76) of each journal bearing (44,46), whereby the cross sectional area of said bearing lands (40,42), minus the cross sectional area of the portions of said shaft (26) surrounded by said bearing lands (40,42), minus the cross sectional area of said journal bearings (44,46) defines a second lubrication transmitting area, said second lubrication transmitting area being greater than the area defined by the clearance between the journal bearing inside diameter and the shaft and the journal bearing outside diameter and the bearing lands (40,42);

said turbocharger further characterized in that said second lubrication transmitting area is equal to or less than said first lubrication transmitting area.

22. A method of lubricating a bearing assembly, said assembly including:

a bearing housing (16) having a bore (38) extending therethrough;

a shaft (26) extending through said bore (38) and adapted to rotate at high speed with respect to said housing (16) and being subjected to axial thrust forces applied thereto in both axial directions, said shaft (26) having a shoulder (52) adjacent one end of said housing (16) and a sleeve (34) carried on said shaft (26) adjacent the opposite end of said housing (16);

said housing (16) having a pair of longitudinally spaced bearing lands (40,42) adapted to surround portions of said shaft (26) and being disposed to one side of said shoulder (52), adjacent inboard end portions of said bearing lands (40,42) being provided with axially outwardly facing inboard thrust surfaces (48,50), the opposite end of one of said bearing lands (42) being adjacent said shoulder (52) and the opposite end of the other bearing land (40) being disposed adjacent said sleeve (34), said housing (16) further being provided with an inlet port (54) for a lubricant, said inlet port (54) being in communication with said bore (38) between said bearing lands (40,42); and a pair of floating journal bearings (44,46) rotatably mounted within said bearing lands (40,42), each journal bearing having an inner surface in proximity to and encompassing a shaft portion and an outer surface in proximity to an adjacent surface of one of said bearing lands (40,42), each journal bearing (44,46) having an inboard end and an outboard end, each journal bearing being provided with axial lubricant communication means (76) extending from said inboard end to said outboard end;

wherein the method includes the steps of:
supplying said inlet port (54) with a lubricant under pressure; and
channeling said lubricant through a plurality of channel paths over and around said journal bearings (44,46) in said bearing lands (40,42), the total area of said channel paths being equal to or less that the area of said inlet (54).

23. The method of claim 22 further including the step of balancing the pressure of the lubricant in all of the channel paths under and over said journal bearings (44,46) to achieve substantially equal lubricant pressure on all radial and axial faces of said journal bearings (44,46).

24. The method of claim 22 wherein said inboard and outboard ends of said journal bearings (44,46) have thrust bearing faces that include inclined surfaces (78) to pressurize lubricant; the method further including the step of forming a lubricant film of pressurized lubricant at the end thrust surfaces of said journal bearings (44,46).

* * * * *